United States Patent
Weaver et al.

(10) Patent No.: US 7,277,858 B1
(45) Date of Patent: Oct. 2, 2007

(54) CLIENT/SERVER RENDERING OF NETWORK TRANSCODED SIGN LANGUAGE CONTENT

(75) Inventors: Farni Weaver, Spring Hill, KS (US); Piyush Jethwa, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 920 days.

(21) Appl. No.: 10/327,501

(22) Filed: Dec. 20, 2002

(51) Int. Cl.
*G10L 21/06* (2006.01)

(52) U.S. Cl. .................. 704/271; 704/270.1; 704/270; 715/532; 379/52

(58) Field of Classification Search ........ 704/270–275, 704/270.1, 2, 3; 715/500.1, 532; 379/52; 382/100
See application file for complete search history.

(56) References Cited

U.S. PATENT DOCUMENTS

| | | | |
|---|---|---|---|
| 5,481,454 A * | 1/1996 | Inoue et al. .................... | 704/3 |
| 5,544,050 A * | 8/1996 | Abe et al. .................... | 715/532 |
| 5,699,441 A * | 12/1997 | Sagawa et al. ............. | 382/100 |
| 5,734,923 A * | 3/1998 | Sagawa et al. .......... | 715/500.1 |
| 5,887,069 A * | 3/1999 | Sakou et al. ................. | 382/100 |
| 5,890,120 A | 3/1999 | Haskell et al. | |
| 5,953,693 A * | 9/1999 | Sakiyama et al. ............. | 704/3 |
| 6,240,392 B1 * | 5/2001 | Butnaru et al. ............. | 704/271 |
| 6,377,925 B1 * | 4/2002 | Greene et al. .............. | 704/271 |
| 6,549,887 B1 * | 4/2003 | Ando et al. .................. | 704/271 |
| 6,570,963 B1 * | 5/2003 | Watson et al. ................ | 379/52 |
| 2002/0069067 A1* | 6/2002 | Klinefelter et al. ...... | 704/270.1 |
| 2004/0034522 A1* | 2/2004 | Liebermann et al. .......... | 704/2 |
| 2004/0102957 A1 | 5/2004 | Levin | |

OTHER PUBLICATIONS

Van, Jon, *Signs of Progress grow; Software Links Languages of Deaf, Hearing*, http:/pqasb.pqarchiver.com/chicagotribune/doc163546011.html?MAC=6191c9a2b91bf7, pp. 1-3, Chicago Tribune, Sep. 9, 2002, printed from the World Wide Web on Dec. 10, 2002.

*Israeli Software Enables Deaf to Use Cell Phones*, http://story.news.yahoo.com/news?tmpl=story2$cid=569&u=/nm/20021126/tc_nm/telecoms_israel?cellcom?dc&printer=1, pp. 1-3, Nov. 26, 2002, printed from World Wide Web on Dec. 10, 2002.

*What is a TTY?*, http:/www.captions.com/tty.html, pp. 1-2, printed from World Wide Web on Oct. 28, 2002.

Nakamura, Karen, *About American Sign Language*, http://www.deaflibrary.org/asl.html, pp. 1-8, printed from World Wide Web on Oct. 28, 2002.

(Continued)

*Primary Examiner*—Vijay Chawan (57) ABSTRACT

A method and system is provided for communicating a interpreted sign-language communication in a communication system having a plurality of nodes including at least a source node, a destination node, and a network node. To facilitate communicating the interpreted sign-language communication, the network node receives from the source node non-sign-language content. The network node stores sign-language-interpreted content in a network queue for retrieval by the destination node. The sign-language-interpreted content defines at least one sign-language translation of the non-sign-language content. When the destination node retrieves and displays the sign-language-interpreted content, a user of the destination node, such as a hearing-impaired individual, can receive communications from the source node that originate in a form other than sign-language format.

41 Claims, 4 Drawing Sheets

OTHER PUBLICATIONS

*List of Methods,* http://www.zak.co.il/deaf-info/old/methods.htm, pp. 1-3, printed from World Wide Web on Oct. 28, 2002.

*A Basic Dictionary of ASL Terms,* http:www.masterstech-home.com/ASLDict.html, pp. 1-6, printed from World Wide Web on Oct. 28, 2002.

*Fingerspelling Graphics,* http://www.lareau.org/disgraph2.html, pp. 1-3, printed from the World Wide Web on Aug. 23, 2002.

*American Sign Language,* http://www.where.com/scott.net/asl/, p. 1, printed from the World Wide Web on Dec. 20, 2002.

*Yamada Language Center: American Sign Language Fonts,* http://babel.uoregon.edu/yamada/fonts/asl.html, pp. 1-3, printed from the World Wide Web on Aug. 23, 2002.

*Announcing,* http://www.isi-icomm.com/icomm/announcing.php3, pp. 1-2, printed from the World Wide Web on Aug. 30, 2002.

*ICommunicator speech Recognition System,* http://www.hearinglossweb.com/Technology/SpeechRecognition/icommunicator.htm, pp. 1-2, printed from the World Wide Web on Aug. 30, 2002.

*MentisSoftiCommunicator Opens New Doors of Communication for Hearing Impaired,* Business Wire, Mar. 23, 2000, pp. 1-3, http://www.deaftoday.com/mar00/dtnusalno432400.html., printed from the World Wide Web on Aug. 30, 2002.

\* cited by examiner

CLIENT/SERVER RENDERING OF NETWORK TRANSCODED SIGN LANGUAGE CONTENT

BACKGROUND

1. Field

The present invention relates in general to computer networks, including telecommunications networks. More particularly, the present invention relates to network and device rendering of network-transcoded, sign-language-interpreted content that originated as non-sign-language content. This invention is particularly useful for making available to and displaying on a destination node, such as a wireless phone, interpreted sign-language communications to allow people, such as hearing-impaired people, to receive communications that originate in a form other than sign-language format.

2. Related Art

Over time, various methods have been developed in attempt to fluently and conveniently communicate with hearing-impaired individuals. Such methods of communication may include (i) Cued Speech; (ii) Seeing Essential English; (iii) Signed Exact English; (iv) Linguistics of Visual English; (v) Signed English; (vi) Pidgin Sign English; (vii) Conceptually Accurate Signed English; (viii) Manually Coded English; (ix) the Rochester Method or "Finger-Spelling;" (x) American Sign Language; and (xi) various others. Many of these methods are not languages in themselves, but signing systems adapted to the native spoken language (in many cases, English) of the area in which the hearing impaired person resides.

While there is a signing form called Gestuno, which not a sign language but rather vocabulary of agreed upon "signs" to be used at international meetings, presently, there is no "universal sign language" or widely accepted international sign language. And while some people refer to lingua franca, which is a developing creole sign language in Europe, as an International Sign Language, this new European creole is not a true natural language from the linguistic perspective.

Unlike the signing systems adapted to spoken languages, American Sign Language (ASL) is a language on its own, which uses no voice and which has its own grammatical and linguistic structure. ASL is a complex visual-spatial language that is used by the deaf community in the United States and English-speaking parts of Canada. ASL is the native language of many deaf people, as well as some hearing children born into deaf families. ASL shares no grammatical similarities to English and is not a broken, mimed, or gestural form of English. In terms of syntax, for example, ASL has a topic-comment syntax, while English uses Subject-Object-Verb syntax. To facilitate the topic-comment syntax, ASL uses facial expression such as eyebrow motion and lip-mouth movements. The use of facial expression is significant because it forms a crucial part of the grammatical system. In addition, ASL makes use of the space surrounding the signer to describe places and people that are not present.

Many of the methods for sign language communication have been developed in face-to-face meetings between the people conversing. Over time, mass communication methods and devices have been implemented in an attempt to allow hearing-impaired people and others communicate without being in face to face contact. For instance, the hardware and software that supports "closed captioning" of television programs is now available on almost every late model television. When a television carrier broadcasts closed-captioned television programs, the television can display trailing or scrolling text messages containing spoken content and symbols indicative of the surrounding non-spoken content (e.g., displaying a musical note symbol indicating a song is playing). In most cases, the closed captioning occurs in synchrony with the ongoing program scenes.

In another attempt to communicate with the hearing impaired without being in face-to-face contact, many telecommunications carriers have implemented Teletype (TTY) service and devices, which are also known as TDDs (Telecommunications Device for the Deaf). A typical TDD device includes a keyboard having about 20 to 30 character keys, a display screen, and a modem. In a TDD system, two callers (hearing or hearing impaired) having TDD devices may communicate with each other by one caller simply "dialing" the other caller. Instead of an audible ring that normally occurs on a standard telephone to indicate an incoming call, the TDD device flashes a light or vibrates a wristband.

After establishing a connection, the users of the two TDD devices simply type characters on their respective keyboards to communicate with each other. These typed characters are converted into electrical signals that can travel over the Plain Old Telephone System (POTS) lines. When the signals reach the destination TDD, they are converted back into characters, which may be displayed on the display screen or alternatively may be printed out on paper.

With the now expansive use of computers, accessibility software and the Internet, many software programs provide sign-language interpretation dictionaries. These dictionaries, whether offline or online at various websites, function somewhat like an English-to-foreign language dictionary, where a user can look up an English word, phrase, and/or statement, and software provides the corresponding sign-language interpreted equivalent. Such available dictionaries include Finger-Spelling Dictionaries, Signed English Dictionaries (and the many variations thereof), ASL Dictionaries, British Signed Language Dictionaries, and many others. These dictionaries can provide animated images, such as concatenated video clips or other video, of the sign-language interpreted content.

These dictionaries are useful for teaching users how to communicate with hearing-impaired people using the signing languages or systems. The dictionaries, however, do not allow a user of a destination device, such as a computer, a cellular telephone and/or a Personal Digital Assistant, to receive from a user of a similar-type source device interpreted sign-language communications that originate in a form other than sign language.

SUMMARY

The present invention is directed to a method and system for communicating an interpreted sign-language communication in a communication system having a plurality of nodes including at least a source node, a destination node, and a network node. To facilitate communicating the interpreted sign-language communication, the network node receives from the source node non-sign-language content. The network node stores sign-language-interpreted content in a network queue for retrieval by the destination node. The sign-language-interpreted content defines at least one sign-language translation of the non-sign-language content.

When the destination node retrieves the sign-language-interpreted content, a user of the destination node, such as a hearing-impaired individual, can receive communications from the source node that originate in a form other than sign-language format.

In an exemplary embodiment, the source node, like the destination node, may be a wireless phone, personal digital assistant, a personal computer, and/or other telecommunication device. The network node may comprise one or more servers providing a host of individual server services, such as proxy/registration services, application services, media services, and/or web services.

The network queue may be a database maintained in a data storage associated with the network node; an input/output buffer of an application, engine or node; one or more memory locations of one or more network nodes; or other queue associated with the network. And for retrieval by the destination node, the network queue may contain one or more sign-language translations of non-sign-language content that originated from the source node.

In one exemplary process of making available an interpreted sign-language communication to a destination node, the source node sends to the network node voice content. Thereafter, the network node or other node on the network may translate the voice content into sign-language-interpreted content. The network node may then populate the network queue with the sign-language-interpreted content. While it may populate the network queue without any interim steps, the network node may populate the network queue with various interim translations as the non-sign-language content is translated to the sign-language-interpreted content.

For example, after receiving the voice content, the network node or some other node on the network may translate it into computer text. The network node then populates the network queue with the computer text. Later, the network node may translate the computer text into the sign-language-interpreted content with which the network node then populates or repopulates the network queue.

At some point, the server node notifies the destination node that the network queue has sign-language-interpreted content for retrieval. Responsive to this notification, the destination node requests and retrieves the sign-language-interpreted content from the network queue and then displays it.

These as well as other aspects and advantages will become apparent to those of ordinary skill in the art by reading the following detailed description with appropriate reference to the accompanying drawings.

BRIEF DESCRIPTION OF THE DRAWINGS

Exemplary embodiments of the invention are described below in conjunction with the appended figures, wherein like reference numerals refer to like elements in the various figures, and wherein.

DETAILED DESCRIPTION OF EXEMPLARY EMBODIMENTS

1. Exemplary Communication System Architecture

Figure 1:
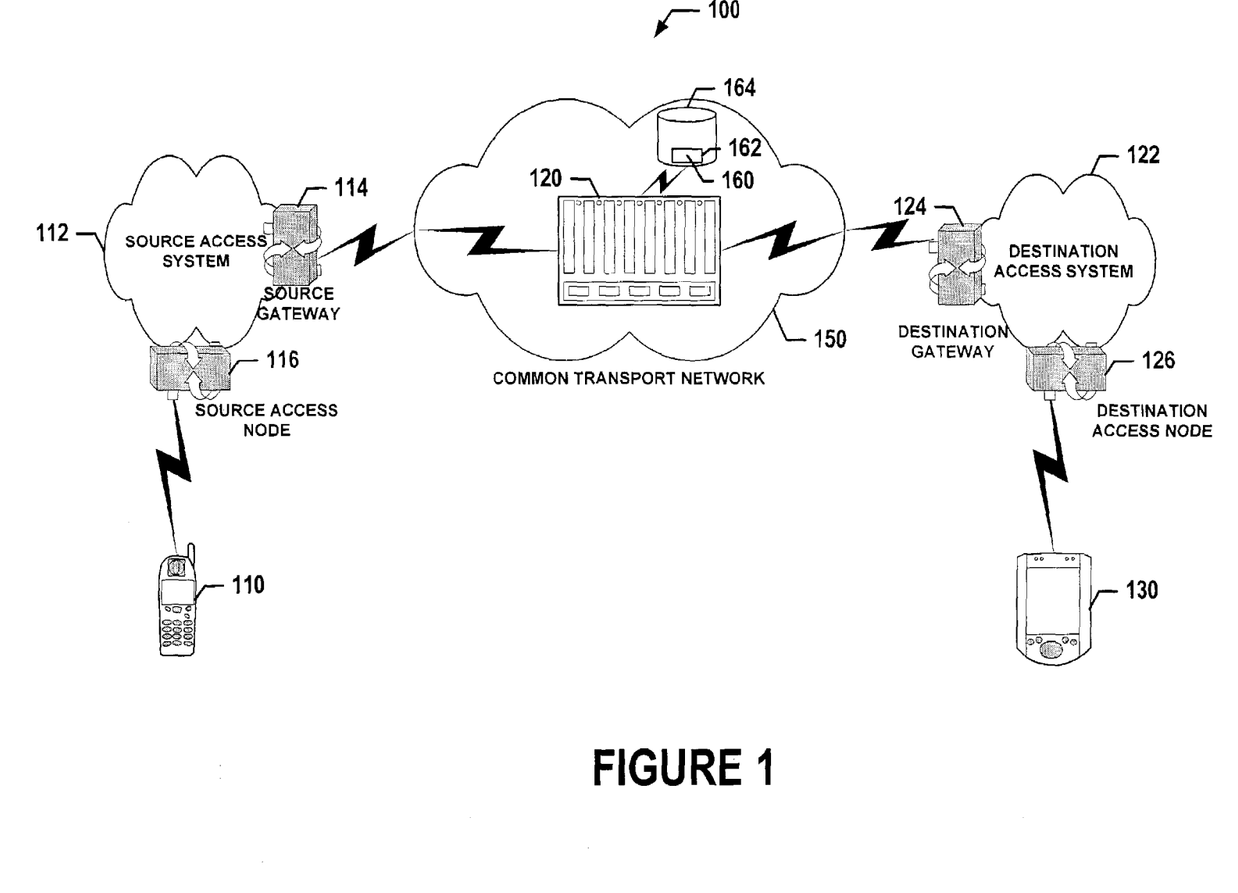
FIG. 1 is a block diagram depicting exemplary network architecture for carrying out one of the exemplary embodiments.

Referring to the drawings, FIG. 1 generally depicts an exemplary communication system 100 for allowing a destination node to receive from a source node sign language communications that originate in a form other than sign-language format. The communication system 100 includes a source node 110 communicatively coupled to network node 120 via a source access system 112, a source gateway 114, and common transport network 150. A destination node 130 is likewise communicatively coupled to the network node 120 via a destination access system 122, a destination gateway 124, and the common transport network 150.

In an exemplary embodiment, the source node 110 may be a wireless phone, personal digital assistant, a personal computer, and/or other telecommunication device. Similarly, the destination node 130 may be a wireless phone, personal digital assistant, a personal computer, and/or other telecommunication device. The network node 110 may comprise one or more server-based computer systems providing individual server services, including proxy/registration services, application services, media services, and/or Web services, for instance.

As shown in FIG. 1, a source access system 112 is located downstream from a common transport network 150. The source access system 112 provides a first communication path for communications exchanged between the common transport network 150 and the source node 110. Included in the source access system 112 is a source access node 116.

When operating in the source access system 112, the source node 110 may communicate with source access system 112 via the source access node 116 over a wired or wireless interface. For convenience, hereinafter this wired or wireless interface may be collectively referred to as the "first interface." The source access system 112 may also include various interconnected network elements to provide one or more segments of the first communication path between the source access node 116 and the source gateway 114.

FIG. 1 also shows a destination access system 122 that is likewise located downstream from the common transport network 150. The destination access system 122 provides a second communication path to the common transport network 150 for communications exchanged between the common transport network 150 and destination node 130. Paralleling the source access system 112, the destination access system 122 includes a destination access node 126.

When operating in the destination access system 122, the destination node 130 may communicate with destination access system 122 via the destination access node 126 over a wired or wireless interface. For convenience, hereinafter this wired or wireless interface may be collectively referred to as the "second interface." The destination access system 122 may also include various interconnected network elements to provide one or more segments of the communication path between the destination access node 126 and the destination gateway 124.

Both the source access system 112 and the destination access system 122 are communicatively coupled to the common transport network 150 through their respective gateways, namely the source and destination gateways 114, 124. Thus, communications exchanged among the common transport network 150 and the source and destination node may pass through the source and destination gateways 114, 124.

Although the source access system 112 and the destination access system 122 are shown separately, the source access system 112 and the destination access system 122 may be the same access system. While the common transport network 150 is shown as one entity, its functions may be distributed among its various interconnected network elements.

2. Exemplary Communication Flow

The source node 110 may send outgoing-non-sign-language content destined for the destination node 130 to the network node 120 via the source access system 112, the source gateway 114, and the common transport system 150. This outgoing-non-sign-language content may be in the form of voice, audio, data, text, and/or other content (hereinafter collectively referred to as "NSL content").

When the source node 110 communicates the outgoing-NSL content over the first interface to the source access system 112, it may send the outgoing-NSL content to the source access node 116 formatted or packaged according to a given protocol. The given protocol may be, for example, a wireless interface protocol, such as the ITU-T G.711 (PCM), ITU-T IS-127 (Enhanced Variable Rate Codec—"EVRC") or the IEEE 802.11d bridging standard. Alternatively, the given protocol may be a wired interface protocol, such as the IEEE 802.3 standard. As the outgoing-NSL content traverses the exemplary communication system 100 from the source access system 112 to the network node 120, it may undergo one or more protocol translations, as needed.

Depending on the type of NSL content received the network node 120 or other node in the communication system 100 may then translate the outgoing-NSL content into sign language interpreted content. This sign-language-interpreted content may include various forms of graphic and/or video media, such as still images, video clips and/or real-time video (hereinafter referred to as "SLI content").

The network node 120 may then populate a network queue 160 with the SLI content for retrieval by the destination node 130. While populating the network queue 160 with SLI content may be performed without any interim steps, the network node 120 can populate the network queue 160 with various interim translations of the NSL content before it is translated to SLI content. If, for example, the network node 120 receives from the source node 110 outgoing NSL content in the form of speech or audio content, then the network node 120 may convert it into a common format, such as computer-text content. A speech-to-text conversion engine can perform such conversion. One such exemplary speech-to-text conversion engine is "Nuance 8.0," which is available from Nuance Communications, Inc., located in Menlo Park, Calif., 94025. Other NSL-to-text conversion engines are available as well.

After conversion, the network node 120 may then populate the network queue 160 with the common-format content. Sometime thereafter, the network node 120 and/or other node may then translate the common-format content into the SLI content. The network node 120 may populate or re-populate the network queue 160 with this SLI content. In this context, it should be understood, if not apparent, that the network queue 160 might not be limited to holding the SLI content at the end of processing, but rather, the network queue 160 may hold the various forms of SLI content during and after processing.

Accordingly, the network queue 160 may be maintained in a database 162 stored on a data storage 164 associated with (i) the network node 120; (ii) an input/output buffer of an application, engine, or node (not shown); (iii) one or more memory locations of one or more network nodes (not shown); and/or (iv) other data store associated with the network. The network queue 160 may be distributed between one or more network nodes. Alternatively, the network queue 160 may be concentrated on a central node on the communication system 100.

At some point, the network node 120 notifies the destination node 130 that the network queue 160 has SLI or an interim translation of the NSL content for retrieval. Responsive to the notification, the destination node 130 requests from the network queue 160 the SLI or interim translation of the NSL content. When requested for retrieval, the network node 120 sends incoming-SLI content downstream to the destination node 130 via the common transport network 150, the destination gateway 124, the destination access system 122, and the destination access node 126. If the network queue 160 contains an interim translation of the NSL content, the network node 120 or other node in the communication system 100 may translate this interim translation into SLI content before forwarding it on to the destination node 130.

The destination node 130 may receive the incoming-SLI content from the destination access node 126 formatted or packaged according to one or more of the given protocols noted above. As incoming-SLI content traverses the exemplary communication system 100 from the network node 120 to the destination access system 122, it may undergo one or more protocol translations, as well.

After receiving the incoming-SLI content, the destination-mobile station 130 displays it, thereby allowing a user of the destination node, such as hearing-impaired individual, to receive from the source node content that originated in a form other than sign-language format.

Figure 2:
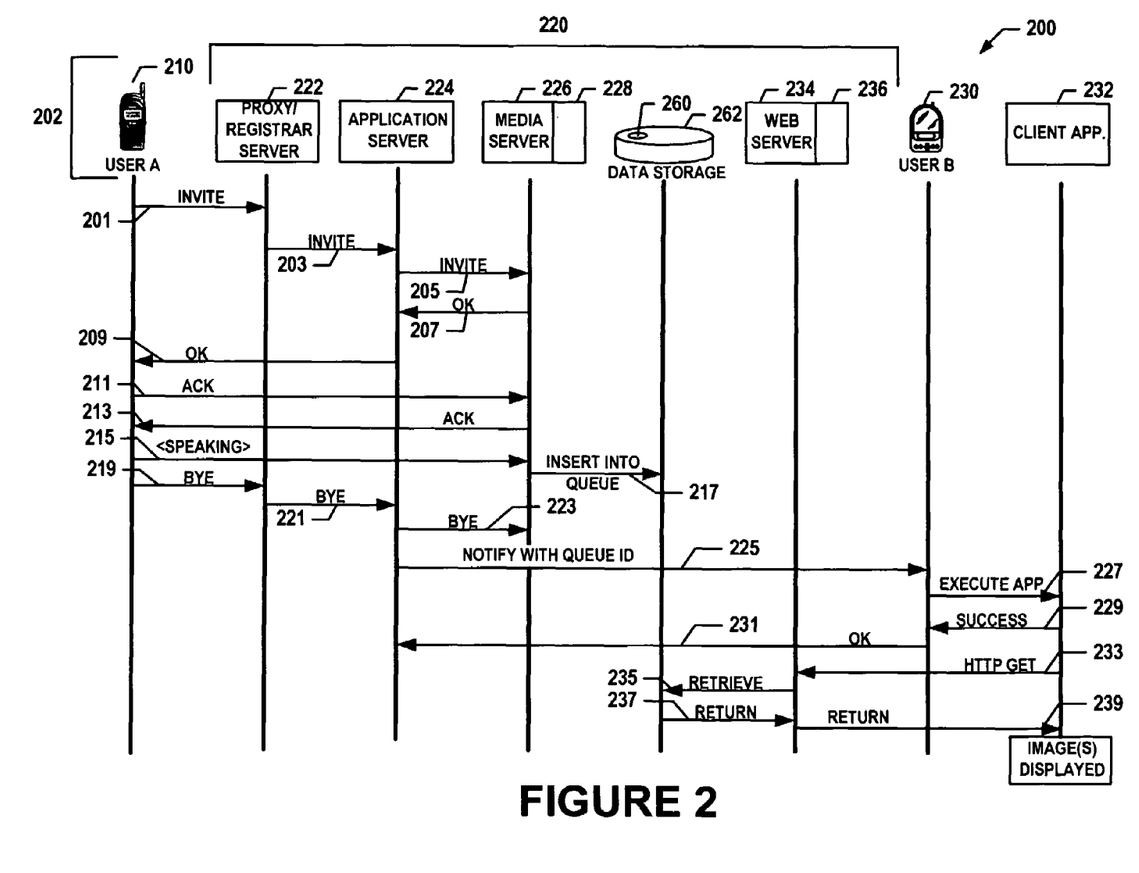
FIG. 2 illustrates a first exemplary communication flow for carrying out one of the exemplary embodiments.
Figure 3:
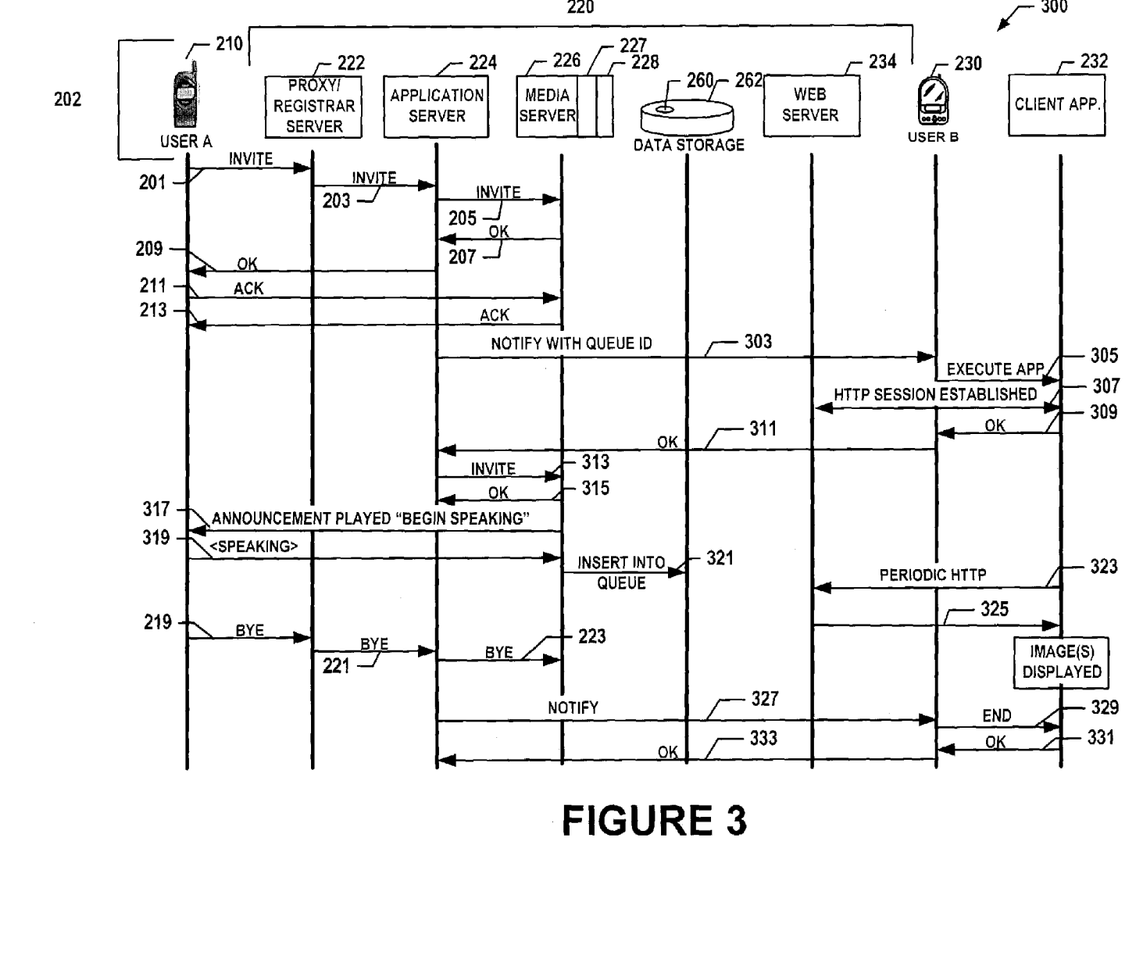
FIG. 3 illustrates a second exemplary communication flow for carrying out one of the exemplary embodiments.
Figure 4:
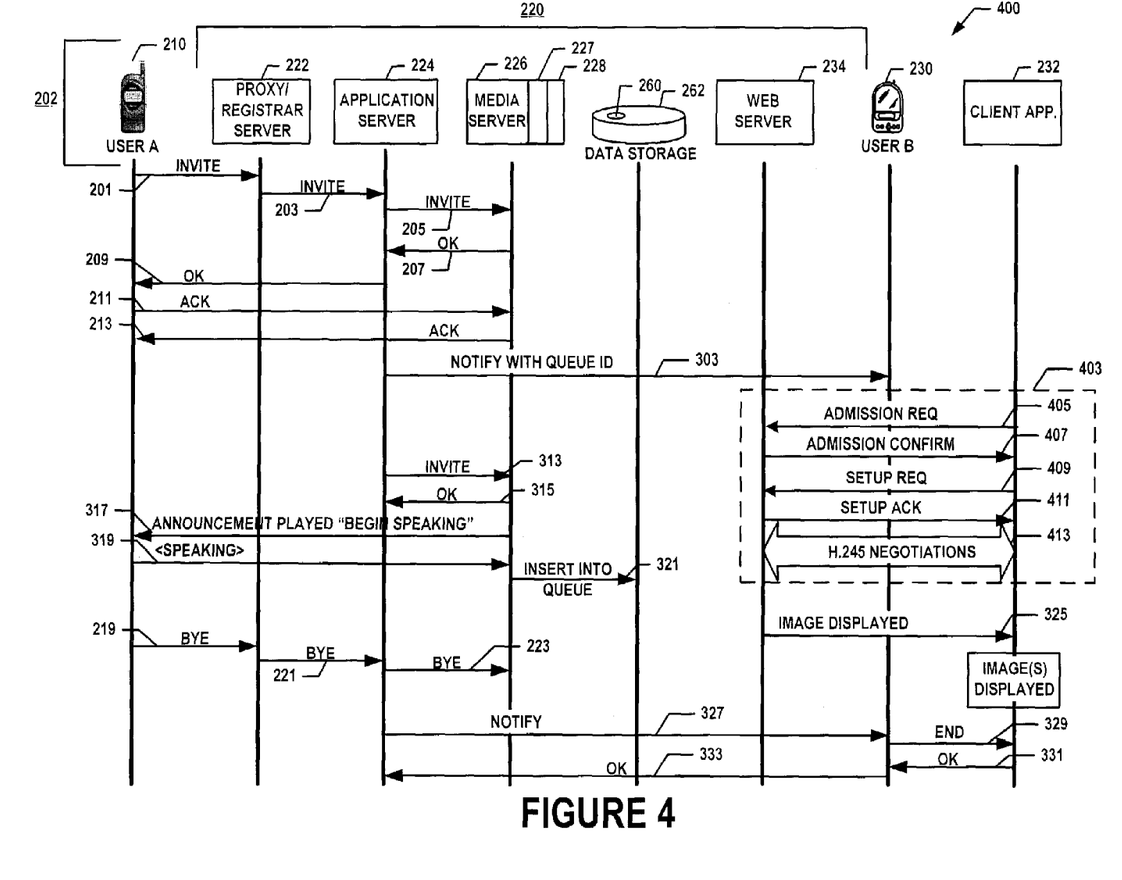
FIG. 4 illustrates a third exemplary communication flow for carrying out one of the exemplary embodiments.

Referring again to the drawings, FIGS. 2-4 illustrate exemplary communication flows 200, 300 and 400 that may be carried out via a wireless communication network 202 ("network"). Each of the communication flows 200, 300, and 400 illustrate a communication between a user of a source-mobile station 210 and a user of a destination-mobile station 230. The user of the source-mobile station 210 carries on communications using NSL content. The user of the destination-mobile station 230 receives communications using SLI content.

In between the source-mobile station 210 and the destination mobile station 230 may be one or more network servers, which are collectively referred to hereinafter as "network cluster" 220. The network cluster 220 may receive upstream outgoing-NSL content from the source-mobile station 210, and later populate a network queue 260 with SLI content for retrieval by the destination-mobile station 230.

Before sending NSL content to the network 202, the source-mobile station 210 may establish connectivity with network cluster 220 using signaling-system messaging. The source-mobile station 210 may be, for example, a Personal Communication System (PCS) cellular phone. The signaling system messages may conform to a signaling-system protocol, such as the Session Initiation Protocol (SIP) and/or other standardized or proprietary signaling-system messaging.

The source-mobile station 210 may initiate a registration process with a registrar server and/or proxy server 222 (collectively referred to as "proxy/registrar server") of the network cluster 220. The source-mobile station 210 may initiate a communication using a first signaling-system request message, or in SIP parlance, using an INVITE message 201.

Using information in the payload of the INVITE message 201, the proxy/registrar server 222 may signal an application server 224 of the network cluster 220 using a second request or SIP INVITE message 203. This second INVITE message 203 may request or instruct the application server 224 to launch an application for accepting outgoing-NSL content from the source-mobile station 210.

In turn, the application server 224 may send a third or a redirecting INVITE message 205 to a media server 226. This signaling message may request the media server 226 to accept the outgoing-NSL content from the source-mobile station 210. Barring a reason to reject the request message (e.g., the source-mobile station 210 lacks proper authorization to use this service), the media server 226 may send a success indication to the application server 224. This success indication may be in the form of a signaling-system reply message, such as a SIP OK message 207. Engaging in signaling-system handshaking, the application server 224 may send a second success indication to the source-mobile station 210 in the form of a second SIP OK message 209.

The source-mobile station 210, in turn, may send an acknowledgment message, such as a SIP ACK message 211, back to the media server 226. To complete the roundtrip handshaking, the media server 226 may send another acknowledgment message or a second SIP "ACK" message 213 to the source-mobile station 210. Once the roundtrip handshaking is completed, connectivity for communicating user content may be established between the source-mobile node 210 and the media server 226. When connectivity is established, the source-mobile station 210 may send the outgoing-NSL content to the media server 226.

Installed on the media server 226 or other server associated with the network cluster 220 is a speech-to-text conversion engine 228, such as the previously mentioned Nuance 8.0 engine, for translating the received outgoing-NSL content into text content. As illustrated by call flow element 215, when the user speaks, the source-mobile station 210 may send the speech content to the media server 226.

At the media server 226, a speech recognition portion of the speech-to-text conversion engine 228 may digitize the speech content and then match the digitized speech content against a dictionary of coded waveforms. A conversion portion of the speech-to-text conversion engine 228 may convert the matching coded-waveforms into text content. This text content may be in the form of a single character, a full word, a phrase, a sentence, slang, and/or other form.

As shown in call flow element 217, the media server 226 may then forward the converted-text content to a persistent queue in a data storage 262, such as a database. Alternatively, the media server 226 may forward the converted-text content to a transient queue in the same or another data store, wherein, for example, the converted-text content is cached in memory. The media server 226 may populate the persistent queue and/or the transient queue (collectively referred to hereinafter as "network queue" 260) with the converted-text content of an entire communication before the application server 224 may notify the destination-mobile station 230 that the network 202 has SLI content for retrieval. In an alternative embodiment, the application server 224 may notify the destination-mobile station 230 that the network 202 has SLI content for retrieval after the media server 226 populates the network queue 260 with some allotment of converted-text content.

In the former situation, when the user of the source-mobile station completes his/her portion of the communication or otherwise stops transmitting, the source-mobile station 210 may terminate its communication session. When terminated, the source-mobile station 210 may issue to the proxy/registrar server 222 a termination message, or in terms of SIP, a BYE message 219. In sequence, the proxy/registrar server 222 may issue to the application server 224 a second BYE message 221. Completing the termination of the communication, the application server 224 issues to the media server 226 a third BYE message 223.

The application server 224 may notify the destination-mobile station 230 that the network has SLI content by using signaling-system messaging. This notification may occur after the destination-mobile station 230 registers with the network cluster 220 via the proxy/registrar server. During registration or sometime thereafter, the destination-mobile station 230 may send to the application server 224 a SIP SUBSCRIBE message for enabling event notification of network queue 160 activity.

Responsive to the earlier SIP SUBSCRIBE message, the application server 224 or a proxy thereof may send a SIP NOTIFY message 225 to the destination-mobile station 230. The payload of the NOTIFY message 225 may contain a reference, pointer, or "queue identifier" of the network queue 260 that contains the converted-text content. The payload of the NOTIFY message 225 may also contain instructions that direct the destination-mobile station 230 to launch a client application 232, such as a Web Browser, Java Applet, and/or other Java platform machine, for retrieving the SLI content.

The destination-mobile station 230, which may include a SIP User Agent or other message handler, receives the NOTIFY message 225. Responsive to the NOTIFY message 225, the destination-mobile station may launch the client application 232 as shown in call flow elements 227, 229. The destination-mobile station 230 then responds to the NOTIFY message 225 with a SIP OK message 231 indicating that the client application 232 is available to and ready to retrieve the SLI content.

Sometime thereafter, the destination-mobile station 230 establishes an Internet session, via a dial-up or other type of connection with a web server 234. The client application 232, via the Internet session, may request the SLI content from the web server 234. In one exemplary embodiment, the client application 232 may request the SLI content by sending to the web server 234 one or more hypertext transfer protocol (HTTP) "GET" messages, as shown in call flow element 233. These messages may include a Uniform Resource Locator (URL) of the web server 234 and the queue identifier of the network queue 260 that contains the SLI content.

After receiving the GET messages, the web server 234 may launch or use a persistent web-server application 236, such as a Java Servlet, so as to provide server-side processing for accessing and retrieving the converted-text content in the network queue 260. This web-server application 236 may also provide server-side processing for translating or interpreting the converted-text content retrieved from the network queue 260 into SLI content. Alternatively, the web server 234 may direct or redirect the client application 232 to an alternative web server or "Website." This alternative website may provide the server-side processing for translating or interpreting the converted-text content retrieved from the network queue 260.

Interpreting the converted-text content may be carried out in various ways. In one exemplary approach, the web-server application 236 may determine the processing capabilities of the destination-mobile station 230 so that the Web-server application 236 only sends the SLI content in a compatible form. The processing capabilities of the destination-mobile station 230 may be determined by various methods. One exemplary method may be provided by the standardized framework of functions defined by the World Wide Web Consortium's (W3C's) "Composite Capabilities/Preference Profiles" ("CC/PP") standard. The CC/PP standard specifies how client devices express their capabilities and preferences to servers that originate content. Details regarding the CC/PP standard may be found at www.w3.org. The CC/PP standard is fully incorporated herein by reference.

When the client application 232 requests the SLI content from the web server 234 using one or more HTTP GET messages, the payload of these GET messages may include the capabilities and user preferences of the destination-mobile station 230. The web-server application 236 using these capabilities and user preferences may determine that the destination-mobile station 230 is capable of receiving streaming video, such as MPEG-7 protocol video or other format video. Alternatively, the web-server application 236 may determine that the destination-mobile station 230 may be only capable of handling Graphics Interchange format (GIF) or other format video clips.

To minimize the number of network transactions, the web server 234 and/or other server of the network cluster 220 may alternatively store default or previously uploaded versions of the capabilities and user preferences in a database associated with the network cluster 220. When the client application 232 requests the SLI content from the web server 234 using the HTTP GET messages 233, instead of sending the capabilities and preferences in the payload of the GET messages, the payload may include the model number or other identifier of the destination-mobile station 230. The web server 234 may then retrieve the capabilities and user preferences for the destination-mobile station 230 from the database associated with the network cluster 220.

After determining the capabilities and user preferences, the web-server application 236 retrieves the converted-text content from the network queue 260, as shown in call flow element 235. The web-server application 236 may compare the converted-text content to entries in one or more server-side, sign-language-interpretation dictionaries so as to locate one or more matches to the converted-text content.

The sign-language-interpretation dictionaries may include, for example, an ASL gesture dictionary and a "Finger Spelling" dictionary. If the web-server application 236 matches the converted-text content to one or more ASL gestures, then it may place video or concatenated video clips of these ASL gestures in the network queue 260 for retrieval by the client application 232, as shown in call flow element 237. If the web-server application 236 is unable to match the converted-text content to an ASL gesture, then using the "Finger-spelling" dictionary, it may place one or more concatenated finger-spelling video clips representative of the converted-text content in the network queue 260. Once queued, the web-server application 236 may forward the video or video clips containing of the ASL gestures and/or finger spelled words to the destination-mobile station 230 in response to the HTTP GET messages 233, as shown in call flow element 239. After receipt, the destination-mobile station 230 may display the video or video clips of the ASL gestures and/or finger-spelled words.

Referring now to FIG. 3, in this exemplary communication flow 300, the network cluster 220 may make available, and the destination-mobile station 230 may retrieve, the SLI content in near, but possibly buffered, real-time. That is, while the source-mobile station 210 transmits the NSL content, the media server 226 receives and if necessary, translates NSL content into converted-text content with which it then populates the network queue 260 in a substantially continuous stream.

To facilitate this exemplary scheme, the application server 224 using a SIP NOTIFY or other notification message 303 may notify the destination-mobile station 230 that the network, 202 has SLI content for retrieval. This may happen when the network queue 260 is about to be populated or is populated with only a portion of the communication from the source-mobile station 210. The SIP NOTIFY message 303 may contain a reference, pointer, or queue identifier of the network queue 260 and instructions that direct the destination-mobile station 230 to launch the client application 232 for retrieving the SLI content.

Using its SIP User Agent or other message handler, the destination-mobile station 230 receives the NOTIFY message 303 and, may responsively launch the client application 232, as shown in call flow element 305. Sometime thereafter, the destination-mobile station 230 establishes an Internet session with the web server 234, as shown in call flow element 307. The client application 232 responsively sends to the destination-mobile station 230 a SIP OK message 309 indicating that the client application 232 is available to and ready to retrieve the SLI content.

The destination-mobile station 230 in turn sends a second SIP OK message 311 to the application server 224 indicating that it is available to and ready to retrieve the SLI content. The application server 224, acting as a client of the media server 226, requests the media server 226 to launch an announcement-server application 227 to receive outgoing NSL content from the source-mobile station 210. In an exemplary embodiment, this may be accomplished by sending a request or SIP INVITE message 313 in which the payload includes one or more instructions for launching the announcement-server application 227 and for requesting the media server 226 to accept NSL content from the source-mobile station 210.

The media server 226 may complete the handshake by sending the application server 224 an acknowledgement or SIP OK message 315. The announcement-server application 227 may be based a VoiceXML application platform to comport with industry standards. VoiceXML is an open, industry-standards-based development language for voice-driven solutions that is endorsed by the W3C; and employed by number of carriers and corporations around the world. Other standardized, proprietary, and/or hybrid announcement-server applications may be employed as well.

After launching the announcement-server application 227, the media server 226 send to the source-mobile station 210 an announcement message 227, such as "Please Begin Speaking," as shown in call flow element 317. When the user speaks, the source-mobile station 210 may send the speech content upstream to the media server 226, as illustrated by call flow element 319. The speech-to-text conversion engine 228 may convert the speech content into text content, which may be in the form of a single character, a full word, a phrase, a sentence, slang, and/or other form. The media server 226 may then forward the converted-text content to the network queue 260, as shown in call flow element 321.

Because the destination-mobile station 230 and its corresponding client application 232 have been previously notified and have an existing Internet session, as the network queue 260 is being populated the destination-mobile station 230 may issue to the web server 234 periodic requests for the SLI content, as illustrated in call flow element 323. In response to the periodic request messages, the web server 234 may use the web-server application 236 to provide server-side processing for accessing, translating or interpreting, and retrieving the converted-text content from the network queue 260.

The web-server application 236 may translate the converted-text content into a substantially continuous flow of SLI content that may be sent synchronously to the destination-mobile station 230, given, the capabilities and user preferences of the destination-mobile station 230 and the transmission capabilities and characteristics of the network connection. After receipt of SLI content from the web-server application 236, the destination-mobile station 230 then displays a substantially continuous stream of the SLI content in a near real-time format. This real-time format may be a buffered video or a series of buffered concatenated video clips, as shown in call flow element 325.

After completing the communication, the source-mobile station 210, the proxy/registrar server 222, the application server 224, and the media server 226 may exchange respective termination and termination responses messages. Responsive to the source-mobile station 210 terminating, the application server 224 may send a notification or SIP NOTIFY message 327 to the destination-mobile station 230 indicating that the source-mobile station 210 has terminated the communication session. After retrieval of any buffered, queued NSI or SLI content, the destination mobile station 230 may terminate the client application 232, as shown in call flow elements 329, 331. Thereafter, the destination-mobile station 230 may send an acknowledgement or SIP OK message 333 to application server 224 to indicate the termination of the client application 232 and to complete the handshake.

Referring now to FIG. 4, the network cluster 220 may make available, and the destination-mobile station 230 may retrieve, the SLI content in substantially real-time. That is, while the source-mobile station 210 transmits the NSL content, (i) the media server 226 receives and if necessary, translates NSL content into converted-text content with which it then populates the network queue 260 in a substantially continuous stream, and (ii) the destination-mobile station 230 may retrieve the SLI content in substantially real-time, so that the user of the destination-mobile station 230 can respond upstream.

In responding upstream, the user of the destination-mobile station 230 may send to the user of the source-mobile station 210 SLI or other format content, via the network cluster 220. This may be performed using a reverse SLI-to-NSL content conversion engine. Alternatively, the destination-mobile station 230 may engage in an NSL content communication via a different communication channel.

The reverse SLI-to-NSL communication is advantageous in wireless communication systems, such as 2G and 2.5G wireless systems, in which only one communication format, i.e., voice or data content, session can occur at a time. However, in 3G and future wireless generations where both voice and data content can occur simultaneously, the user of the destination-mobile station 230 may carry on a second communication session with the source-mobile station 210 via its data channel. As noted, this second communication session may be carried out using NSL and/or SLI content. In the case of the NSL content, the second communication session in essence makes the source-mobile station behave as a destination-mobile station.

Assume for this exemplary embodiment that the destination-mobile station 230 and its corresponding client application 232, have been previously notified that the network queue 260 has been or is being populated and is carrying on an existing Internet session with the web server 236. Assume also that the destination mobile station 230 is capable of communicating real-time video, streaming real-time video, or other format real-time video according to a standardized protocol such as H.323 and its sub-protocols, which include the Real Time Transport Protocol and the Real-time Transport Control Protocol. Further, assume that the web server 234 has determined the capabilities and user preferences of the destination-mobile station 230.

At call flow element 403, the web server 232 and the destination-mobile station 230 may negotiate a real-time connection according to the H.323 protocol. In facilitating the real-time connection, the destination-mobile station 230 may send to the Web-server 234 or a proxy thereof an admission request message 405. The admission request message 405 may contain (i) the URL of the web server 234; (ii) an indication of the address of the destination-mobile station; (iii) authentication, authorization and accounting information; and/or (iv) other information. In response to the admission request message 405, the web server 234 replies to the destination-mobile station 230 with a successful admission confirmation message 407, thereby authorizing access to the network 202. This admission confirmation message 407 may contain the address of the web server 234 or a proxy thereof.

Next, the destination-mobile station 230 may send a setup request message 409 to the web server 234 that requests, among other things, Quality and/or Class of Service parameters for the communication. The Quality and/or Class of Service parameters may vary based on the predetermined capabilities and user preferences of the destination-mobile station 230. The web server 234 may send to the destination-mobile station 230 a setup acknowledgement message 411. With the setup request acknowledged, the communication can proceed. Thereafter, the destination-mobile station 230 and the web server 234 may negotiate the communication session 413 according to the H.245 protocol and establish logical channels between the destination-mobile station 230 and the web server 234.

As the user of the source-mobile station speaks, the media server 224 may receive, convert, and populate the network queue 260 with one or another form of the NSL content. As the network queue 260 is populated, the web server application 236 may translate the NSL content into SLI content using one or more sign-language interpretation dictionaries. In turn, the web server 234 may send to the destination-mobile station 230 via the H.245 connection 413 the SLI content in substantially real-time When either the source-mobile station 210 or the destination-mobile station 230 terminates the communication session, shortly thereafter, the destination-mobile station 230 may display any remaining SLI content and terminate the H.323 communication session with the web server 234.

3. Conclusion

In the foregoing detailed description, numerous specific details are set forth in order to provide a thorough understanding of exemplary embodiments. It will be understood, however, that the present invention may be practiced without these specific details. In other instances, well-known methods, procedures, and components have not been described in detail, so as not to obscure the claimed invention. For instance, the communication system discussed above may be a current, future or legacy communication system. This means that the communication system may be a wired or wireless, packet or circuit switched network, or some combination thereof.

Today, second generation ("2G") networks can provide multimedia communication services to mobile nodes. These 2G networks, however, have their foundation in older circuit-switched or packet-switched technologies that make the transmission of video and data quite slow, and this, limit the type of multimedia, video and data services that can be used. With such limitations, the destination node 130 (FIG. 1) may retrieve the SLI content as a series of concatenated images.

Alternatively, the destination node 130 may retrieve the SLI content as a string of Short Message Service messages using a standardized messaging system such as IS-41 or GSM Mobile Application Part MAP (GSM MAP). Details of the IS-41 signaling system may be found in the ANSI/TIA/EIA-41-D-97 standard, which was published in 1997, and which is fully incorporated herein by reference. Furthermore, details of GSM MAP signaling system may be found in the European Telecommunications Standards Institute ETS 300 599 ed.9 standard (GSM 09.02 version 4.19.1), which was published in 2001, and which is fully incorporated herein by reference.

Newer second-and-a-half generation ("2.5G") network services have been deployed. These 2.5G networks use newer packet-switched technologies that allow for increased transmission speeds for video and data as compared to 2G networks. Although 2.5 networks have increased transmission speed as compared to 2G networks, current 2.5G networks also have limitations on the types of multimedia, video, and data services that can be used. Like the 2G limitations, the destination node 130 may retrieve a series of concatenated GIF still images and/or animated GIF video clips.

In addition to the 2G and 2.5G networks, the destination node 130 may take advantage of third generation ("3G") network services, which allow for significantly faster data rates that in turn allow for a broader range of multimedia, video and data services to be used on a roaming mobile node. These 3G networks provide packet switched services with the capability of providing Internet Protocol traffic, such as Mobile Internet Protocol ("Mobile IP") traffic; symmetrical and asymmetrical data rates; multimedia services such as video conferencing and streaming video; international roaming among different 3G operating environments; and more.

Typical 3G systems include packet-based transmission of digitized voice, data and video. 3G networks encompass a range of wireless technologies such as Code Division Multiple Access ("CDMA"), Universal Mobile Telecommunications Service ("UMTS"), Wide-band CDMA ("WCDMA"), and others. Unlike the 2G and 2.5 limitations, deployments of 3G networks, such as 1xRTT (i.e., CDMA2000 phase 1, "1xEv-DO" and phase 2, "1xEV-DV), have sufficient bandwidth and other capabilities that allow for providing streaming video, so that the destination node 130 may retrieve streaming MPEG and/or other type video.

Other real-time media may also be used with the method and system discussed above, and in conjunction with roaming from one access system to another or when roaming from one access technology to another. An example of these other real-time media include streaming video on a network-connected node or mobile node using streaming technology such as Microsoft's NetShow or Real Audio's Real player. Like the NSL content communication session, a real-time media session of SLI content allows a user to continue to watch the same stream uninterrupted or slightly interrupted as the mobile node moves to another access technology.

In addition to the public wired and wireless communication systems, the present invention can conveniently take advantage of the higher data rates, the lower cost, and the superior (as compared with CDMA and other public wireless networks) building coverage of IEEE 802.11 wireless local area networks (WLAN), Bluetooth, and other private wireless networks. These WLANs, like 3G networks, allow a broad range of multimedia, video and data services. The WLANs, which have their origin in Ethernet technology, provide packet switched services with the capability of providing Internet Protocol traffic; symmetrical and asymmetrical data rates; multimedia services such as video conferencing and streaming video; and more. As such, these WLANs may provide Voice over Internet Protocol applications and NSL-to-SLI conversions to carry out a communication in real-time using one or more streaming technologies in accordance with the method and system of the present invention.

In view of the wide variety of embodiments to which the principles of the present invention can be applied, it should be understood that the illustrated embodiments are exemplary only, and should not be taken as limiting the scope of the present invention. For example, the steps of the call flows may be taken in sequences other than those described, and more or fewer elements may be used.

Moreover, the claims should not be read as limited to the described embodiments, order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. In a communication system having a plurality of nodes including at least a source node, a destination node, and a network node, a method of communicating an interpreted sign-language communication comprising:

the network node receiving non-sign-language content from the source node via a first cellular wireless communication network;

the network node translating the non-sign-language content into sign-language-interpreted content; and the network node storing the sign-language-interpreted content in a network queue for retrieval by the destination node via a second cellular wireless communication network, wherein the sign-language-interpreted content defines at least one sign-language translation of the non-sign-language content.

2. The method of claim 1, wherein the second cellular wireless communication network is the same cellular wireless communication network as the first cellular wireless communication network.

3. The method of claim 1, wherein the function of the network node storing in a network queue for retrieval by the destination node sign-language-interpreted content comprises the network node populating the network queue with the sign-language-interpreted content in real-time so as to provide a continuous stream of sign-language-interpreted content while the network node is receiving the non-sign-language content from the source node.

4. The method of claim 1, further comprising the network node notifying the destination node that the network queue has for retrieval by the destination node sign-language-interpreted content.

5. The method of claim 4, wherein the function of the network node storing in a network queue for retrieval by the destination node sign-language-interpreted content comprises the network node populating the network queue with the sign-language-interpreted content comprising an entire interpreted sign-language communication, and wherein the function of the network node notifying the destination node that the network queue has sign-language-interpreted content for retrieval occurs after the network node populates the network queue with the sign-language-interpreted content comprising the entire interpreted sign-language communication.

6. The method of claim 4, wherein the function of the network node storing in a network queue for retrieval by the destination node sign-language-interpreted content comprises the network node populating the network queue with the sign-language-interpreted content, wherein the sign-language-interpreted content comprises a portion of an interpreted sign-language communication, and wherein the function of the network node notifying the destination node that the network queue has sign-language-interpreted content occurs after the network node populates the network queue with the sign-language-interpreted content comprising a portion of the interpreted sign-language communication.

7. The method of claim 4, wherein the function of the network node storing in a network queue for retrieval by the destination node sign-language-interpreted content comprises the network node populating the network queue with the sign-language-interpreted content, wherein the sign-language-interpreted content comprises a portion of the interpreted sign-language communication, and wherein the function of the network node notifying the destination node that the network queue has sign-language-interpreted content occurs before the network node populates the network queue with the sign-language-interpreted content comprising a portion of the interpreted sign-language communication.

8. In a communication system having a plurality of network nodes including at least a source node, a destination node, and a network node, wherein the source node transmits non-sign-language content to the network node via a first cellular wireless communication network, a method of communicating an interpreted sign-language communication comprising:

the destination node retrieving sign-language-interpreted content from a network queue via a second cellular wireless communication network, wherein the sign-language-interpreted content defines at least one sign-language translation of the non-sign-language content; and the destination node displaying the sign-language-interpreted content.

9. The method of claim 8, further comprising the destination node receiving notice that the network queue has for retrieval sign-language-interpreted content.

10. The method of claim 8, further comprising the destination node receiving notice that the network queue has for retrieval sign-language-interpreted content that comprises the entire interpreted sign-language communication.

11. The method of claim 8, further comprising the destination node receiving notice that the network queue has for retrieval sign-language-interpreted content that comprises a portion of the interpreted sign-language communication.

12. The method of claim 8, wherein the function of the destination node retrieving from a network queue sign-language-interpreted content comprises the destination node retrieving from the network queue sign-language-interpreted content after the network queue is populated with the entire interpreted sign-language communication.

13. The method of claim 8, wherein the function of the destination node retrieving from a network queue sign-language-interpreted content comprises the destination node retrieving from the network queue sign-language-interpreted content once the network queue is populated with a portion of the interpreted sign-language communication.

14. The method of claim 8, wherein the network queue is populated with the sign-language-interpreted content in real-time, and wherein the function of the destination node retrieving from a network queue sign-language-interpreted content comprises the destination node retrieving from the network queue sign-language-interpreted content in real-time so as to receive a continuous stream of the sign-language-interpreted content while the source node transmits the non-sign-language content to the network node.

15. The method of claim 8, wherein the second cellular wireless communication network is the same cellular wireless communication network as the first cellular wireless communication network.

16. In a communication system having a plurality of network nodes including at least a source node, a destination node, and a network node, a method of communicating an interpreted sign-language communication comprising:

a source node sending to the network node non-sign-language content via a first cellular wireless communication network;

the network node receiving the non-sign-language content;

the network node translating the non-sign-language content into sign-language-interpreted content;

the network node populating a network queue with the sign-language-interpreted content for retrieval by the destination node;

the network node notifying the destination node that the network queue has for retrieval by the destination node sign-language-interpreted content;

the destination node retrieving the sign-language-interpreted content from the network queue via a second cellular wireless communication network; and the destination node displaying the retrievable sign-language-interpreted content.

17. The method of claim 16, wherein the non-sign-language content comprises voice content.

18. The method of claim 16, wherein the non-sign-language content comprises text, and wherein the function of the network node translating the non-sign-language content into sign-language-interpreted content comprises the network node converting the text into sign-language-interpreted content.

19. The method of claim 16, wherein the non-sign-language content comprises voice content, and wherein the function of the network node translating the non-sign-language content into sign-language-interpreted content comprises:

the network node converting the voice content into text; and the network node converting the text into sign-language-interpreted content.

20. The method of claim 16, wherein the function of the destination node retrieving the sign-language-interpreted content from the network queue comprises:

the destination node establishing a communication session with at least one of the network nodes associated with the network queue;

the destination node requesting the sign-language-interpreted content from the network queue; and the destination node receiving the sign-language-interpreted content from the network queue via the at least one of the network nodes associated with the network queue.

21. The method of claim 16, wherein the second cellular wireless communication network is the same cellular wireless communication network as the first cellular wireless communication network.

22. In a communication system for communicating an interpreted sign-language communication to a destination node, a network node comprising:
   at least one processor;
   data storage that is accessible to the at least one processor,
   at least one logic module stored on the data storage and executable by the at least one processor to:
   receive from a source node non-sign-language content via a first cellular wireless communication network; and
   store in a network queue sign-language-interpreted content for retrieval by the destination node via a second cellular wireless communication network, wherein the sign-language-interpreted content defines at least one sign-language translation of the non-sign-language content.

23. The network node of claim 22, wherein the at least one executable logic module comprises executable logic stored on the data storage and executable by the at least one processor.

24. The network node of claim 23, further comprising additional executable logic to translate the non-sign-language content into the sign-language-interpreted content.

25. The network node of claim 23, wherein the communication system includes a source node operable to transmit non-sign-language content to the network node via the first cellular wireless communication network, wherein the executable logic to store in a network queue sign-language-interpreted content for retrieval by the destination node via the second cellular wireless communication network comprises executable logic to populate the network queue with the sign-language-interpreted content in real-time so as to provide a continuous stream of sign-language-interpreted content while the network node receives the non-sign-language content from the source node.

26. The network node of claim 23, further comprising additional executable logic to notify the destination node that the network queue has for retrieval by the destination node sign-language-interpreted content.

27. The network node of claim 26, wherein the executable logic to store in a network queue for retrieval by the destination node sign-language-interpreted content comprises executable logic to populate the network queue with the sign-language-interpreted content that comprises an entire interpreted sign-language communication, and wherein the executable logic to notify the destination node that the network queue has for retrieval sign-language-interpreted content occurs after the network node populates the network queue with the entire interpreted sign-language communication.

28. The network node of claim 26, wherein the executable logic to store in a network queue for retrieval by the destination node sign-language-interpreted content comprises executable logic to populate the network queue with the sign-language-interpreted content that comprises an entire interpreted sign-language communication, and wherein the executable logic to notify the destination node that the network queue has for retrieval sign-language-interpreted content occurs before the network node populates the network queue with the entire interpreted sign-language communication.

29. The network node of claim 26, wherein the executable logic to store in a network queue for retrieval by the destination node sign-language-interpreted content comprises executable logic to populate the network queue with the sign-language-interpreted content that comprises a portion of an interpreted sign-language communication, and wherein the executable logic to notify the destination node that the network queue has sign-language-interpreted content occurs after the network node populates the network queue with the portion of the interpreted sign-language communication.

30. The network node of claim 22, wherein the second cellular wireless communication network is the same cellular wireless communication network as the first cellular wireless communication network.

31. In a communication system for communicating an interpreted sign-language communication to a destination node, wherein the communication system has a plurality of network nodes including at least the destination node, a source node, and a network node, wherein the source node transmits non-sign-language content to the network node via a first cellular wireless communication network, the destination node comprising:
   at least one processor;
   data storage that is accessible to the at least one processor,
   at least one logic module stored on the data storage and executable by the at least one processor to:
   retrieve from a network queue associated with the network node sign-language-interpreted content via a second cellular wireless communication network, wherein the sign-language-interpreted content defines at least one sign-language translation of the non-sign-language content; and
   display the sign-language-interpreted content.

32. The destination node of claim 31, wherein the at least one executable logic module comprises executable logic stored on the data storage and executable by the at least one processor.

33. The destination node of claim 32, further comprising additional executable logic to receive notice that the network queue has for retrieval sign-language-interpreted content.

34. The destination node of claim 32, wherein the executable logic to retrieve from a network queue associated with the network node sign-language-interpreted content comprises the executable logic to retrieve from the network queue sign-language-interpreted content after the network queue is populated with the entire interpreted sign-language communication.

35. The destination node of claim 32, wherein the executable logic to retrieve from a network queue associated with the network node sign-language-interpreted content comprises executable logic to retrieve from the network queue sign-language-interpreted content once the network queue is populated with a portion of the interpreted sign-language communication.

36. The destination node of claim 32, wherein the network queue is populated with the sign-language-interpreted content in real-time, and wherein the executable logic to retrieve from a network queue associated with the network node sign-language-interpreted content comprises executable logic to retrieve from the network queue sign-language-interpreted content in real-time so as to receive a continuous stream of the sign-language-interpreted content while the source node transmits the non-sign-language content to the server node.

37. The destination node of claim 31, wherein the second cellular wireless communication network is the same cellular wireless communication network as the first cellular wireless communication network.

38. A system for communicating an interpreted sign-language communication, the system comprising:
- a means for sending to a network node non-sign-language content via a first cellular wireless communication network;
- a means for receiving the non-sign-language content;
- a means for translating the non-sign-language content into sign-language-interpreted content;
- a means for populating a network queue with the sign-language-interpreted content for retrieval by a destination node;
- a means for notifying the destination node that the network queue has sign-language-interpreted content for retrieval;
- a means for retrieving the sign-language-interpreted content from the network queue via a second cellular wireless communication network; and
- a means for displaying the retrievable sign-language-interpreted content.

39. The system of claim 38, wherein the non-sign-language content comprises voice content, and further comprising:
- a means for converting the voice content into text; and
- a means converting the text into sign-language-interpreted content.

40. The system of claim 38, further comprising:
- a means for establishing a communication session with at least one of the network nodes associated with the network queue;
- a means for requesting the sign-language-interpreted content from the network queue; and
- a means for receiving the sign-language-interpreted content from the network queue via the second cellular wireless communication network and via the at least one of the network nodes associated with the network queue.

41. The system of claim 38, wherein the second cellular wireless communication network is the same cellular wireless communication network as the first cellular wireless communication network.

* * * * *